(12) United States Patent
Gegalski et al.

(10) Patent No.: US 6,641,230 B2
(45) Date of Patent: Nov. 4, 2003

(54) ANTI-LOCKING BRAKE SYSTEM FOR A LAND VEHICLE

(75) Inventors: Helmut Gegalski, Mühlheim-Kärlich (DE); Thomas Wald, Holnich (DE); Josef Knechtgens, Mayen (DE); Thomas Bach, Koblenz (DE); Andreas Marx, Kaltenengers (DE); Frank Heller, Neuwied (DE); Michael Schwarz, Koblenz (DE); Thomas Wagner, Vallendar (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/962,010

(22) Filed: Sep. 24, 2001

(65) Prior Publication Data

US 2002/0067073 A1 Jun. 6, 2002

Related U.S. Application Data

(63) Continuation of application No. PCT/EP99/04466, filed on Jun. 28, 1999.

(30) Foreign Application Priority Data

Mar. 24, 1999 (WO) .............................. PCT/EP99/02000

(51) Int. Cl.[7] ................................................. B60T 8/48
(52) U.S. Cl. .............................. 303/113.2; 303/116.2; 303/119.2; 303/900
(58) Field of Search ..................... 303/116.1, 116.2, 303/119.2, 900, 173.2

(56) References Cited

U.S. PATENT DOCUMENTS

| | | | |
|---|---|---|---|
| 3,447,568 A | 6/1969 | Burkart et al. | ........... 303/119.2 |
| 3,575,213 A | 4/1971 | Schnall | |
| 4,589,706 A | * | 5/1986 | Leiber ........................ 303/900 |
| 5,131,730 A | 7/1992 | Kollers et al. | |
| 5,205,623 A | 4/1993 | Holzmann et al. | |

(List continued on next page.)

FOREIGN PATENT DOCUMENTS

| | | |
|---|---|---|
| DE | 12305087 | 2/1967 |
| DE | 4118719 | 12/1992 |
| DE | 4035527 | 4/1993 |

(List continued on next page.)

*Primary Examiner*—Matthew C. Graham
(74) *Attorney, Agent, or Firm*—MacMillan, Sobanski & Todd, LLC (57) ABSTRACT

An anti-locking brake system for a land vehicle, which is set up in particular for traction control and vehicle dynamics control, comprises a pump (42) for actuating a wheel brake (37) which removes brake fluid from a brake pressure generating unit (31) and supplies it to the wheel brake (37), wherein a first valve arrangement (1) blocks in a non-actuated (normal) position (1.1) the connection between the brake pressure generating unit (31) and an input connection (42e) of the pump (42) and in at least one actuated position (1.3) establishes a primary flow connection (A), a first electromagnetic valve (50) establishes in a non-actuated position (50.1) the connection between an output connection (42a) of the pump (42) and the brake pressure generating unit (31), and blocks it in an actuated position (50.2), a second electromagnetic valve (39) blocks the connection between the wheel brake (37) and the input connection (42e) of the pump (42) in a non-actuated position, and in an actuated position establishes it, and a third electromagnetic valve (38) establishes the connection between the output connection (42a) of the pump (42) and the wheel brake (37) in a non-actuated position (38.1) and blocks it in an actuated position (38.2). To generate a more accurate pressure modulation during the operating phase "maintain pressure" (II), the third electromagnetic valve (38) is in the actuated position during said operating phase.

17 Claims, 6 Drawing Sheets

U.S. PATENT DOCUMENTS

| | | |
|---|---|---|
| 5,207,487 A | 5/1993 | Holzmann et al. |
| 5,265,943 A * | 11/1993 | Kehl et al. .................. 303/900 |
| 5,265,948 A * | 11/1993 | Holzmann .................. 303/900 |
| 5,397,174 A | 3/1995 | Willmann |
| 5,707,116 A * | 1/1998 | Tsuru et al. ............. 303/113.2 |
| 5,735,582 A | 4/1998 | Eith et al. |
| 5,810,330 A | 9/1998 | Eith et al. |
| 5,865,213 A | 2/1999 | Scheffel et al. |
| 5,884,985 A * | 3/1999 | Ganzel et al. ........... 303/113.2 |
| 6,032,692 A | 3/2000 | Volz |
| 6,050,654 A | 4/2000 | Gegalski et al. |
| 6,135,579 A | 10/2000 | Beck |
| 6,209,970 B1 | 4/2001 | Kamiya et al. |
| 6,213,570 B1 | 4/2001 | Gegalski et al. |
| 6,224,170 B1 | 5/2001 | Hosoya |
| 6,254,200 B1 | 7/2001 | Ganzel |

FOREIGN PATENT DOCUMENTS

| | | |
|---|---|---|
| DE | 19530899 | 9/1998 |
| DE | 19725241 | 12/1998 |
| EP | 0460408 | 12/1991 |
| FR | 2 615 585 | 5/1987 |
| WO | WO 93 07035 | 4/1993 |
| WO | WO 96 15926 | 5/1996 |
| WO | WO 96 36518 | 11/1996 |
| WO | WO 98 13242 | 4/1998 |
| WO | WO 98 57834 | 12/1998 |
| WO | WO 97 06040 | 2/1999 |
| WO | WO 97 07002 | 3/2000 |

* cited by examiner

ANTI-LOCKING BRAKE SYSTEM FOR A LAND VEHICLE

CROSS REFERENCE TO RELATED APPLICATION

This application is a continuation of PCT application number PCTIE99/04466 filed Jun. 28, 1999, which designates the U.S., and which further claims priority to PCT application number PCT/EP99/02000 filed Mar. 24, 1999, which designates the U.S., the disclosures of which are incorporated herein by reference.

BACKGROUND

The invention relates to an anti-locking brake system for a land vehicle, which is set up in particular for traction control and vehicle dynamics control in such a way that a pump for actuating a wheel brake removes brake fluid in a controlled manner from a brake pressure generating unit and supplies it to the wheel brake.

From DE 40 35 527 A1 it is known to provide a 2-setting/2-position valve between the input side of the pump and the brake pressure generating unit. Said valve arrangement has only one actuation and/or connection setting. In said case, the flow cross section of said one actuation and/or connection setting has to be very large so that, upon entry into the directional stability control system, a rapid pressure build-up in the wheel brake is achieved via the pump, especially in order at low temperatures to achieve a good intake performance (high pumping capacity) of the pump. A large flow cross section however entails the drawbacks of loud hydraulic flow noises and severe pedal reactions, which is perceived as intrusive and far from comfortable.

Such a valve arrangement is known as a so-called "normal-closed" (NC) valve. In the non-actuated state, i.e. the basic or normal position, the flow connection between the fluid connections of the valve arrangement is blocked, whereas in the actuated state the flow connection between the fluid connections is established. So that in the non-actuated state the flow connection between the fluid connections is blocked, a valve element under the action of a spring arrangement is biased so as to come sealingly into abutment with a sealing seat. In order in the actuated state to establish the flow connection between the fluid connections, it is necessary for the actuating device to summon up a force which is capable of surmounting at least the bias force of the spring arrangement so that the valve element lifts off the sealing seat.

However, in most applications it is not enough for the actuating device to summon up a force which is only slightly greater than the bias force of the spring arrangement because during operation different fluid pressures arise at the fluid connections of the valve arrangement, so that the valve element is additionally acted upon by a pressure differential force which, depending on the effective direction, is in the opposite direction to the force summoned up by the actuating device. The actuating device accordingly has to be designed in such a way that the actuating force is greater than the sum of the bias force of the spring arrangement and the maximum anticipated pressure differential force in order to guarantee reliable functioning of the valve arrangement. One drawback of this is that the actuating device has to be over dimensioned for many situations, particularly when, as in the majority of applications, in the actuated state of the valve arrangement a large flow cross section is required to prevent a throttling effect of the valve arrangement. A large flow cross section however additionally entails a very high pressure differential force, as a consequence of which a high actuating force has to be summoned up. The result is high costs and a high outlay when designing the valve arrangement. The size of the valve arrangement is also relatively large as a result.

In such a brake system which is set up for traction control and vehicle dynamics control it should be possible to generate, independently of a brake pedal actuation, brake pressure in the wheel brake/s to prevent by active brake engagement slipping of the driven wheels or skidding of the vehicle, especially when driving through curves. Such a brake systems is in a known manner bassed on a conventional brake system already adapted for anti lock control.

To be able to use the pump anyway provided in the anti lock control for returning brake fluid also for generating brake pressure in traction control and vehicle dynamics control, it is known from DE 38 32 023 C2 to additionally use a 3-setting/2-position valve which in a non-enabled condition, for a normal braking or anti lock control, establishes connection between the master cylinder and the output side of the pump and severs the connection to the input side of the pump. In the enabled condition the 3-setting/2-position valve severs for traction control the connection between master brake cylinder and output side of the pump and establishes the connection to the input side of the pump so that for generating brake pressure the pump can on the input side suck brake fluid from the master brake cylinder and at the output side feed it into the wheel brake/s. During traction control the brake pressure modulation is effected in a known manner by means of the valves provided for the anti-lock control.

There is the problem that brake pressure modulation results in considerably varying pressure levels between the output side of the pump and the wheel brake/s which causes intrusive hydraulic flow noises.

According to the above discussed DE 40 35 527 A1, now a valve combination is used which comprises two 2-connection/2-position valves instead of the additional 3-setting/2-position valve known from DE 38 32 023 C2, and which in an enabled condition severs both the connection between master cylinder and output side of the pump and the connection to the input side of the pump for the traction control.

Since the valve positions known from DE 38 32 023 C2 already allow pressure build-up and pressure reduction, this further valve position allows also to maintain the pressure as the input side of the pump is blocked so that no brake fluid can be taken. This is to make it possible to perform brake modulation during traction control exclusively via the two 2-setting/2-position valves, i.e. without switching the valves provided for the anti-lock control. Hydraulic flow noises as mentioned above are thus reduced.

However, it is a drawback in this connection that a precise brake pressure modulation is not possible during traction control. Even if the input side of the pump is blocked in order to maintain the pressure, there is always a small fluid volume at the input side of the pump which effects a minor pressure build-up rather than the desired maintenance of the pressure which as a whole renders pressure modulation inaccurate. Though the accuracy of the pressure modulation described in DE 40 35 527 A1 may be sufficient for traction control, it cannot at all or only by tolerating a restricted efficiency of the brake system be transferred onto a traction control because when driving through curves, an active brake intervention requires a precise brake pressure modulation to compensate for the vehicle's tendency to oversteer or understeer. Too rough a brake pressure modulation would be impossible first of all for reasons of the brake system's safety.

SUMMARY OF THE INVENTION

An object of the invention is to provide an anti-locking brake system while avoiding the previously described drawbacks. The brake system according to the invention is to meet the high demands made on a vehicle dynamics control and has at the same time to be applicable for the traction control.

To achieve the object, according to the invention an anti-locking brake system is further developed in that during the operating phase "maintain pressure", contrary to the position of the electromagnetic valve described in DE 40 35 527 A1, the third electromagnetic valve is in the actuated position. Accordingly, connection between the output connection of the pump and the wheel brake is blocked and a small fluid volume at the input side of the pump can not, as is possible with the brake system described in DE 40 35 527, be fed to the wheel brake through the pump. Due to this actually simple change of the position of the electromagnetic valve, surprisingly accuracy of the pressure modulation is considerably improved. This high accuracy is of importance especially for the vehicle dynamics control.

In addition, according to the invention, the anti-lock brake system described in DE 40 35 527 A1 has been developed further particularly in that between the brake pressure generating unit and an input connection of the pump a valve arrangement is provided which is designed as a 2-connection/3-position valve and which in a non-actuated (normal) position blocks the connection between the brake pressure generating unit and the input connection of the pump, in a first actuating position establishes a secondary flow connection between the brake pressure generating unit and the input connection of the pump, and in a second actuating position establishes a primary flow connection between the brake pressure generating unit and the input connection of the pump, wherein the primary flow connection has a larger flow cross section than the secondary flow connection.

All of the drawbacks of the previously described known arrangement (DE 40 35 527 A1) may be avoided by the solution according to the invention, which additionally provides a further actuating position with a reduced flow cross section. For, by said means, the volumetric flow from the brake pressure generating unit to the pump may be precisely metered. This applies particularly when the volumetric flow is modulated by a purposeful temporary switch between the normal position (1.1) and the first actuating position (1.2). Thus, during regulation of the brake pressure in the wheel brake the pressure level at the output side of the pump may be adapted almost to the pressure level in the wheel brake, with the added result that hydraulic noises are reduced.

A further advantage of the anti-locking brake system according to the invention is that, before the primary flow connection is established, a secondary flow connection is first established. Because of the secondary flow connection, in the situation where different fluid pressures at the fluid connections additionally exert a pressure differential force upon the valve element a pressure-equalizing process between the fluid connections is first initiated, thereby eliminating the pressure differential force so that during establishment of the primary flow connection the pressure differential force is no longer effective and may no longer have disadvantageous consequences. Thus, only a relatively low actuating force is required, with the result that the actuating device may be of a low-cost, simple design which takes up little installation space. As a result, the flow cross section determined mainly by the primary flow connection may be relatively generous in order to rule out an undesirable throttling effect in the flow behaviour of the valve arrangement. As the secondary flow connection has only a small flow cross section compared to the primary flow connection, the pressure differential force to be surmounted during the establishment of the second flow connection is negligibly low.

In an advantageous development, during an operating phase "reduce pressure" the first valve arrangement is in the non-actuated position and the first, second and third electromagnetic valves are in the respective actuated position. Instead of allowing the pressure to only flow into the brake pressure generating unit, as described in DE 40 35 527 A1, according to the invention brake fluid is fed into the store through the open second electromagnetic valve, and thus conveyed away from the wheel brake in a defined manner. At the store, a counter pressure generated by a spring opposes the flowing-off brake fluid, so that the pressure decreases at an exactly predetermined rate. During this, the thus actuated—namely blocked—third electromagnetic valve prevents that brake fluid under pressure gets from the braking line at the output connection of the pump to the wheel brake which would involuntarily weaken the pressure reduction.

The anti-locking brake system is advantageously developed further in such a manner that the first valve arrangement establishes in a further actuated position a secondary flow connection between the brake pressure generating unit and the input connection of the pump, with the secondary flow connection having a smaller flow cross-section than the primary flow connection, and that during an operating phase "build up further pressure" the first valve arrangement is in the further actuated position while the first electromagnetic valve is in the actuated position and the second and third electromagnetic valves each are in the non-actuated position. The above described further advantages of the invention and consequently an exactly defined pressure build-up at the wheel brake can be attained in this manner.

An advantageous development of the invention provides that during an operating phase "maintain further pressure" the third electromagnetic valve is in the non-actuated position while the first electromagnetic valve is in the actuated position and the first valve arrangement and the second electromagnetic valve each are in the non-actuated position. In the operating phase "build up further pressure" preceding the operating phase "maintain further pressure" the third electromagnetic valve is closed and the valve arrangement was opened only in a throttled manner. Thus the pump has generated a strong suction at the input connection so that at the beginning of the operating phase "maintain further pressure" no fluid volume is at its input connection that might be conveyed through the pump and involuntarily increase the pressure at the wheel brake. Thus, according to the invention, at the beginning of the operating phase "maintain further pressure" actuation of the third electromagnetic valve is dispensed with to reduce switching noises.

The anti-locking brake system may advantageously be developed further in that during an operating phase "reduce further pressure" the third electromagnetic valve is in the non-actuated position while the first and second electromagnetic valves are in the actuated position each and the first valve arrangement is in the non-actuated position. Contrary to the above described operating phase "reduce pressure" in which the third electromagnetic valve is actuated—namely blocked—during the operating phase "reduce further pressure" according to the invention the third electromagnetic valve may remain non-actuated. This is possible since a pressure compensation has taken place from the output connection of the pump through the opened third electromagnetic valve up to the wheel brake already during an operating phase "maintain further pressure", and brake fluid flows exclusively into the store during opening of the second electromagnetic valve at the beginning of the operating phase "reduce further pressure". This guarantees a controlled pressure reduction and at the same again reduces switching noises.

In a preferred form of construction of the invention, the valve arrangement comprises a first valve element, which is biased into the (normal) position by a spring arrangement, wherein a first actuating device is provided for bringing the valve element into the first actuating position, and a further valve element is provided, which is biased into the (normal) position by a further spring arrangement, and can be set by a further actuating device to the second actuating position, so that upon actuation of the valve arrangement initially only into the secondary flow connection and then the primary flow connection exist.

The actuating device and/or the further actuating device may preferably be electromagnetically and/or hydraulically controlled. Thus, in particular, the actuating device, which actuates the valve element to establish the primary flow connection, may be electromagnetically controlled and the further actuating device, which actuates the further valve element to establish the secondary flow connection, may be hydraulically controlled. In said case, the further hydraulically actuated actuating device may be controlled by means of the pressure difference existing between the fluid connections in order to establish the secondary flow connection for the purpose of initiating the pressure-equalizing process between the fluid connections. When after elimination of the pressure differential force the primary flow connection is established by the electromagnetically actuated actuating device, the actuating force to be summoned up is likewise only relatively low. This has a particularly advantageous effect upon the design of the electromagnetic arrangement of the actuating device, because the fact that the electromagnetic force to be summoned up is relatively low on the one hand means an energy-saving and hence inexpensive current input and on the other hand enables a compact design of the components of the magnetic circuit, above all of the coil and the armature.

Figure 5:
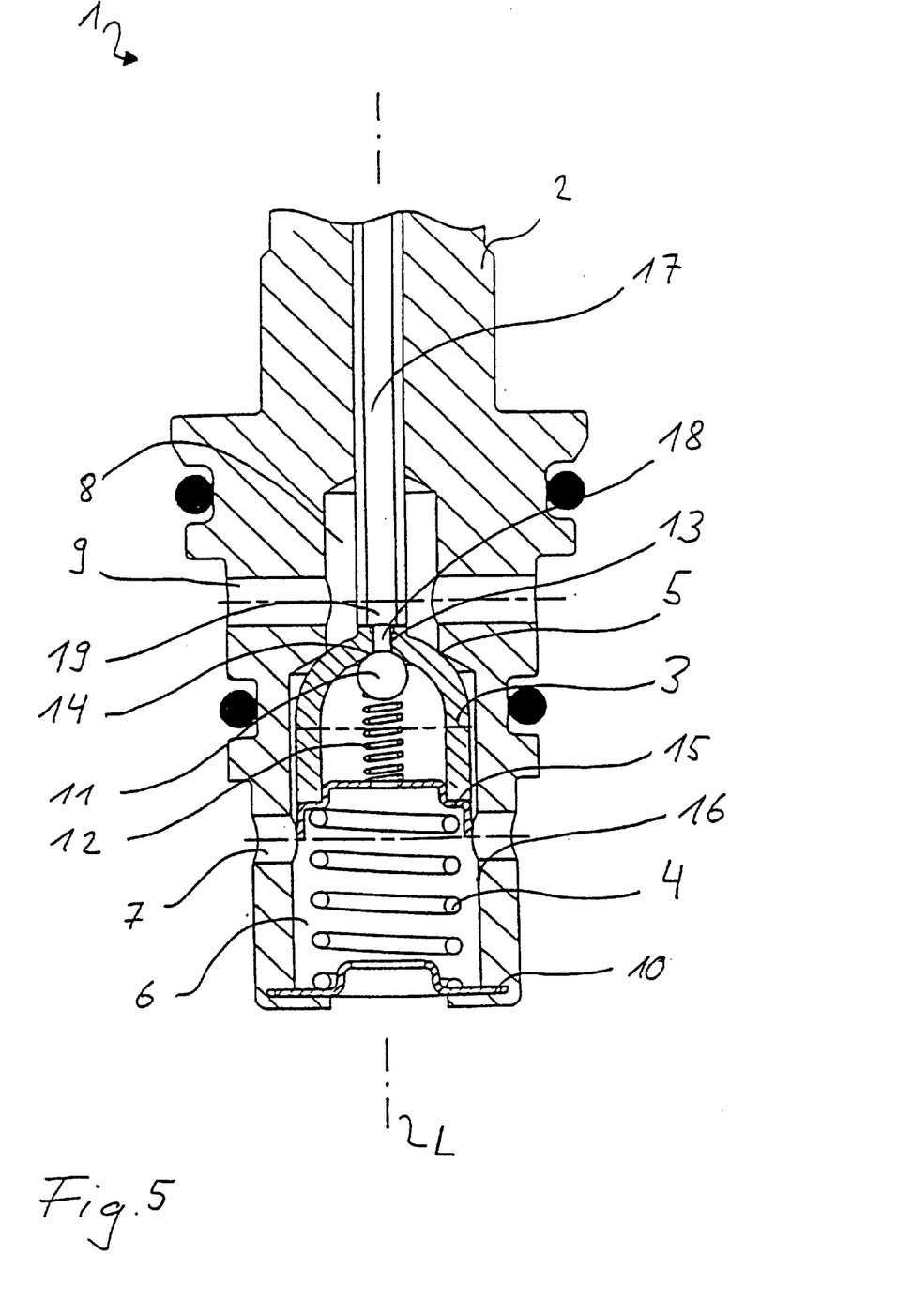
FIG. 5 shows an embodiment of a valve arrangement for use in the inventive anti-locking vehicle brake system according to FIG. 3 in non-actuated condition.
Figure 6:
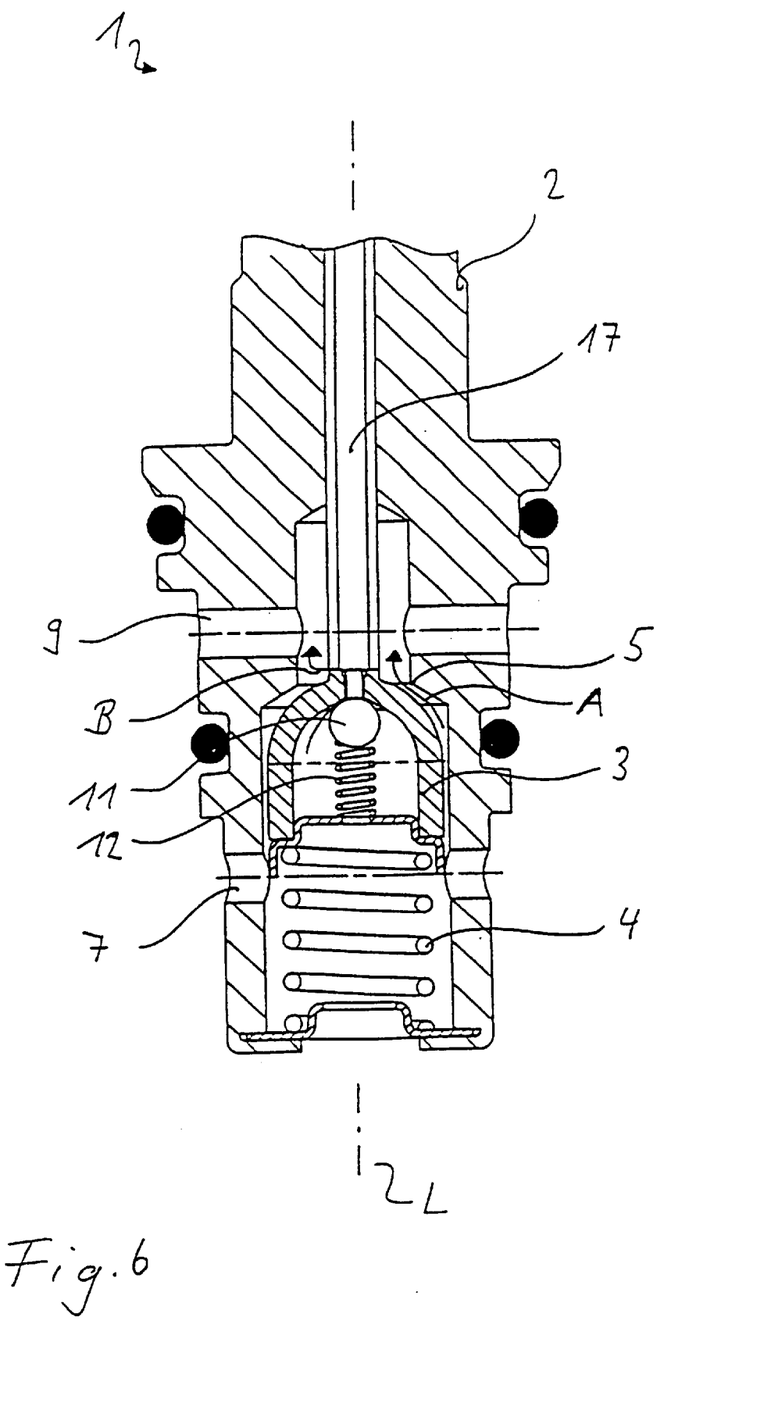
FIG. 6 shows an embodiment of a valve arrangement for use in the inventive anti-locking vehicle brake system according to FIG. 3 in actuated condition.

The valve arrangement illustrated in FIG. 5 in the non-actuated condition and in FIG. 6 in the actuated condition is especially suited to be used as a two-connection/three-position valve inserted between the brake pressure generating unit and the input side of the pump. For its use here, the valve arrangement is flow-powered only in such a manner that with a first flow for establishing the first operating position only the further valve member is actuated (secondary flow connection B), and that with a second flow for establishing the second operating position the valve member is still actuated further (primary flow connection A).

According to a preferred embodiment, both the valve element and the further valve element can be actuated by a common actuating device. In particular, because of the previously described advantages, said common actuating device may be electromagnetically controlled. Said actuating device may comprise a two-stage plunger, which in dependence upon the armature moving the actuating device in a first stage actuates only the further valve element in order initially to establish the second flow connection, and then in a second stage to actuate additionally or exclusively the valve element, which establishes the primary flow connection characterizing the flow behaviour of the valve arrangement. Furthermore, one actuating device is saved, thereby allowing components and costs to be saved, and also a compact style of construction of the valve arrangement is achieved by virtue of the common actuating device.

In a particularly preferred embodiment, the valve element is dome-shaped and the further valve element is spherical, wherein the further valve element is disposed inside the valve element, thereby allowing the valve arrangement to be designed in a particularly space-saving manner.

The bias force of the spring arrangement is advantageously greater than the bias force of the further spring arrangement. As a result, the actuating force for establishing the secondary flow connection, which depends on the bias force of the further spring arrangement, is particularly low, above all when there are different fluid pressures at the fluid connections. The further spring arrangement may moreover be supported via the spring arrangement in order to achieve a simple and space-saving design of the valve arrangement.

From the aspects of simplicity and saving installation space, it is advantageous when the primary flow connection is determined by a sealing seat formed on the housing of the valve arrangement and by the valve element. The same applies when the secondary flow connection is formed by a sealing seat formed on the valve element and by the further valve element.

As the balance of forces is determined, on the one hand, by the actuating force to be summoned up by the actuating device and, on the other hand, by the bias force to be summoned up by the spring arrangement and, occasionally, by the pressure differential force between the fluid connections of the valve arrangement, with a view to simplicity and saving installation space the spring arrangement may be supported against the housing of the valve arrangement. The same advantage exists when the further spring arrangement is supported via the valve element.

An advantageous alternative is when the further valve element is integrally connected to the actuating device, with the result that components of the valve arrangement may be saved or may be easier to manufacture. In said case, to make the valve arrangement even more compact, it may be provided that the further spring arrangement biases the actuating device so that the further valve element occupies its first position, wherein the further spring arrangement is supported against the housing of the valve arrangement.

In a particularly preferred manner the valve arrangement according to the invention is to be used in an anti-locking brake system, which is set up for traction control and vehicle dynamics control, and to said end comprises a pump, which removes brake fluid from a brake pressure generating unit in order to supply the brake fluid to a wheel brake, wherein the first fluid connection of the valve arrangement is connected to the brake pressure generating unit and the second fluid connection of the valve arrangement is connected to the input side of the pump. Use of the valve arrangement according to the invention offers the great advantage that, on the one hand, a relatively large flow cross section is provided from the brake pressure generating unit to the input side of the pump so that the pump, above all at low temperatures, i.e. when the brake fluid behaves in a viscous manner, may deliver a relatively high volumetric flow. On the other hand, only a relatively low actuating force has to be summoned up when the valve arrangement is pressurized at the brake pressure generating unit side, which is the case upon actuation of the brake pressure generating unit by the driver via the brake pedal or upon automatic actuation of the brake pressure generating unit for preloading the pump.

BRIEF DESCRIPTION OF THE DRAWINGS

The invention and further advantageous refinements will be described in the following with reference to the drawings.

DETAILED DESCRIPTION OF THE PREFERRED EMBODIMENT

Figure 1:
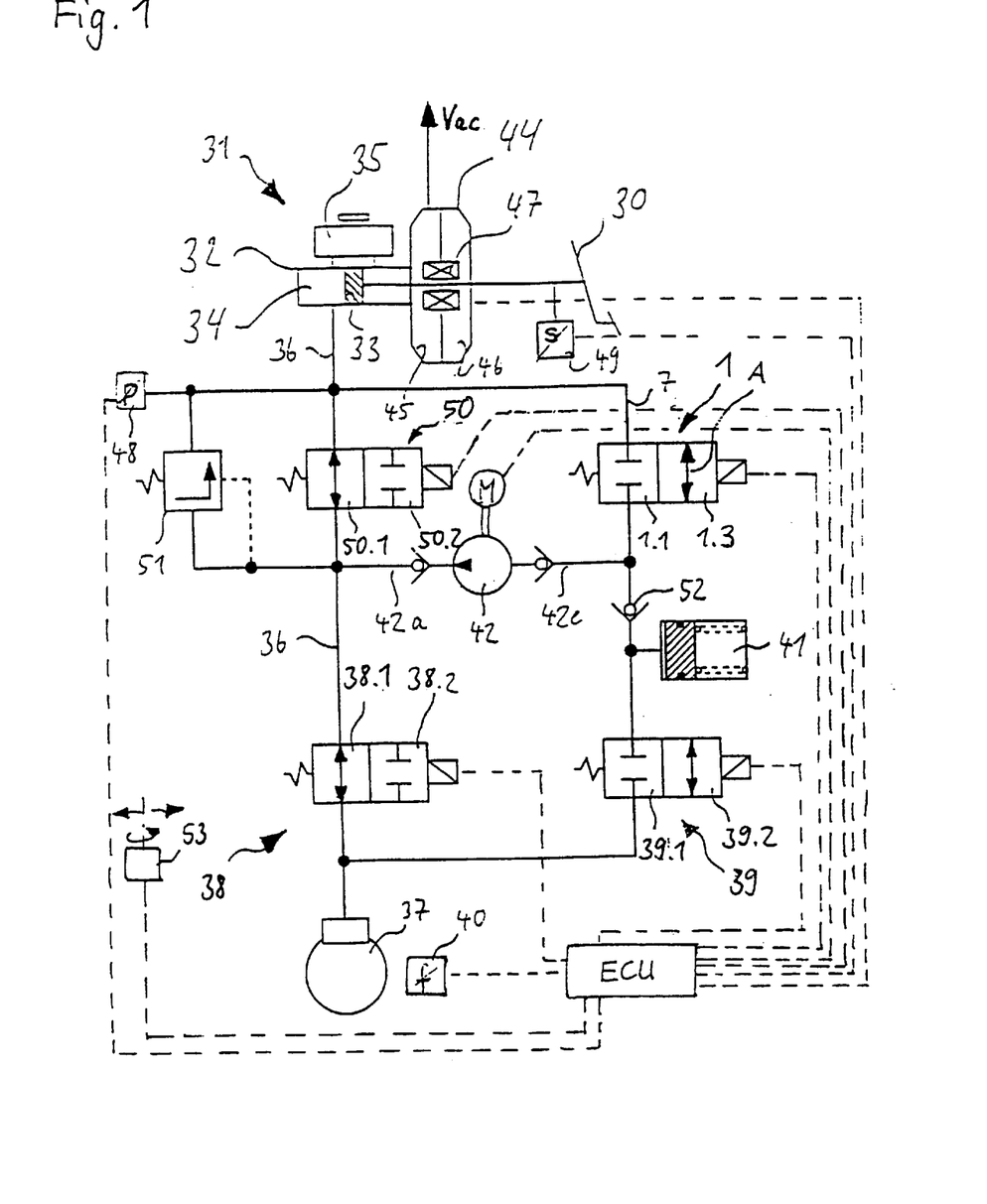
FIG. 1 shows a diagrammatic view of a vehicle anti-locking brake system according to the invention in a first embodiment.
Figure 3:
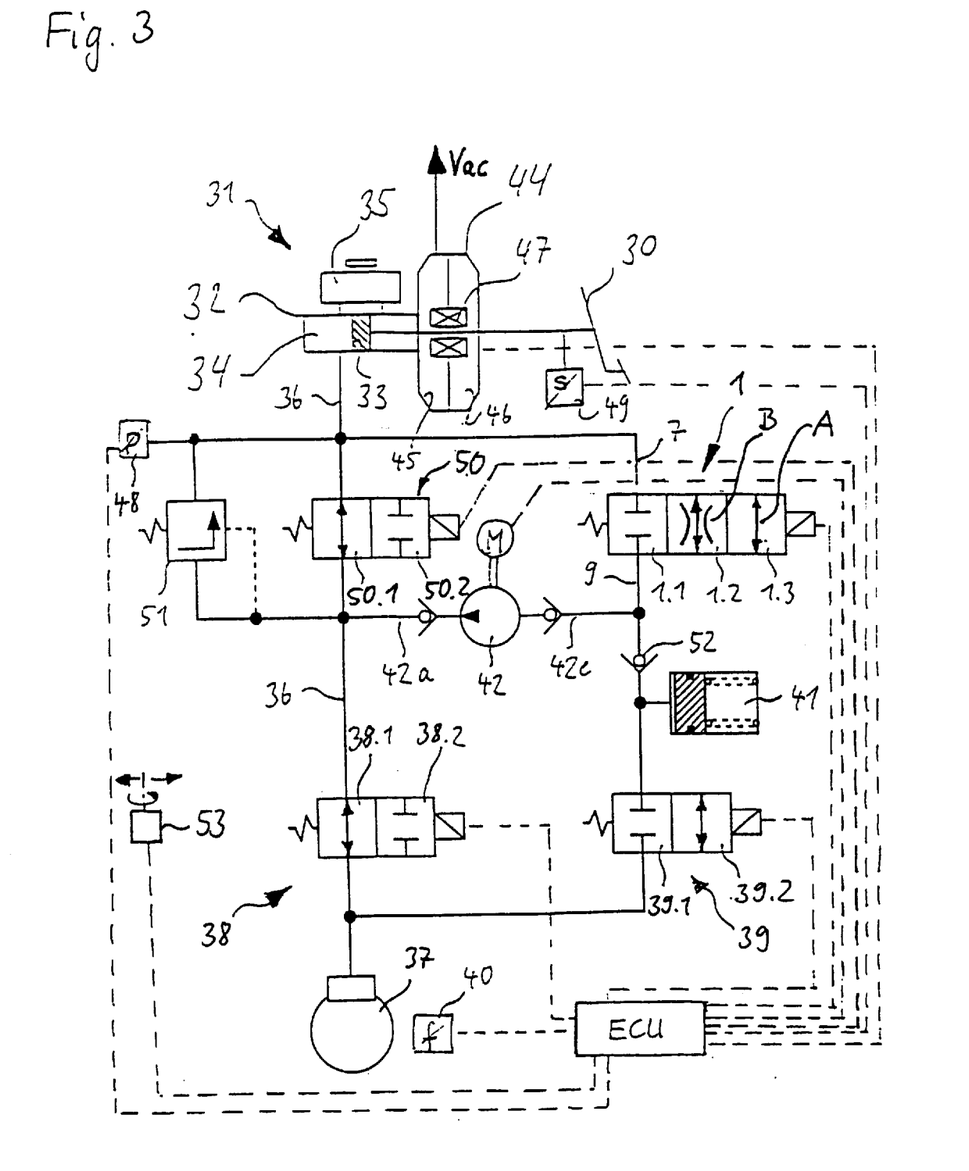
FIG. 3 shows a diagrammatic view of an anti-locking brake system in a second embodiment.

In FIGS. 1 and 3 an anti-locking brake system according to the invention for motor vehicles is diagrammatically illustrated. A brake pedal 30 is used to actuate a brake pressure generating unit 31 via an actuating element. The brake pressure generating unit 31 comprises a brake cylinder 32 in which a piston 33 forms a pressure chamber 34. The pressure chamber 34 is supplied with brake fluid from a store 35. A brake line 36 leads from the pressure chamber 35 to a wheel brake 37 of the motor vehicle.

In the brake line 36 a valve device 38, 39 is disposed between the brake pressure generating unit 31 and the wheel brake 37. The valve device 38, 39 is formed by two electromagnetic valves, which are activated in each case by an electronic control unit ECU in order to modulate the pressure in the wheel brake 37. To said end, the electronic control unit ECU via a sensor 40 detects the rotating characteristics of the vehicle wheel associated with the wheel brake 37 in order, through suitable activation of the electromagnetic valves 38, 39, to adjust pressure build-up, pressure reduction and pressure holding phases.

In the electrically non-actuated state the electromagnetic valve 38 occupies its open position 38.1 and the electromagnetic valve 39 its blocked position 39.1 to enable pressure to build up in the wheel brake 37. When only the electromagnetic valve 38 is actuated, the electromagnetic valve 38 moves into its blocked position 38.2 and the second electromagnetic valve 39 remains in its blocked position 39.1 so that the pressure in the wheel brake 37 is held constant. When both the first and the second electromagnetic valve 38, 39 are actuated, the electromagnetic valve 38 moves into its blocked position 38.2 and the electromagnetic valve 39 moves into its open position 39.2 In said case, brake fluid may flow from the wheel brake 37 via the second electromagnetic valve 39 into a temporary store 41. By means of a hydraulic pump 42 the brake fluid situated in the temporary store 41 is fed back into the brake line 36. The hydraulic pump 42 is driven by an electric motor 43 which is likewise activated by the electronic control unit ECU. The valve device 38, 39 may alternatively be designed with a mechanical volume controlling valve instead of the first electromagnetic valve 38 or with an electromagnetically actuated three-connection/2-position or three-connection/three-position valve instead of the two electromagnetic valves 38, 39.

To boost the actuating force introduced via the brake pedal 30, the brake pressure generating unit 31 comprises a pneumatic brake booster 44. A movable wall subdivides the pneumatic brake booster 44 into a vacuum chamber 45 and a pressure chamber 46. For generating the vacuum, the vacuum chamber 45 is connected to a vacuum source Vac, which is not shown in detail. In a motor vehicle equipped with an Otto engine, the vacuum which, based on said principle, is generated in the intake manifold, is available as vacuum source Vac. In a motor vehicle driven by a diesel engine or electric motor, on the other hand, an additional vacuum pump is required as vacuum source Vac. Upon actuation of the brake pedal 30, the brake booster 44 operates in a known manner in that the pressure chamber 46 is loaded with atmospheric pressure so that at the movable wall a pressure difference is effective which boosts the actuating force introduced at the brake pedal 30. In the non-actuated state, the vacuum chamber 45 and the pressure chamber 46 are connected to one another and hence pressure-equalized, so that there is no pressure difference effective at the movable wall.

The brake booster 44 may also be electrically controllable by means of an electromagnetic arrangement 47. The electromagnetic arrangement 47 actuates a control valve (not shown in detail here) to bring the brake booster 44 into various control positions. Firstly, into a first so-called build-up position, in which the connection of the vacuum chamber 45 to the pressure chamber 46 is blocked and the connection of the pressure chamber 46 to the atmosphere is open, so that a pressure difference is built up and/or increased at the movable wall. Or secondly, into a second so-called holding position, in which the connection of the vacuum chamber 45 to the pressure chamber 46 and the connection of the pressure chamber 46 to the atmosphere are blocked, so that a pressure difference effective at the movable wall is maintained. Or thirdly, into a third so-called reduction position, in which the connection of the vacuum chamber 45 to the pressure chamber 46 is open and the connection of the pressure chamber 46 to the atmosphere is blocked, so that by means of a pressure-equalizing process a pressure difference effective at the movable wall is reduced. To bring the control valve into the different control positions, the electronic control unit ECU energizes the electromagnetic arrangement 47 with a current in such a way that adjustment of the previously described control positions is effected e.g. by pulse width modulation of the current signal. The brake pressure generated in the pressure chamber 46 and introduced into the brake line 36 is detected by means of a sensor 48 and relayed to the electronic control unit ECU in order to regulate the brake pressure in dependence upon a desired pressure value and/or pressure characteristic.

The electric controllability of the brake booster 44 makes it possible for braking operations to be effected also automatically, i.e. independently of an actuation of the brake pedal 30, as is the case, for example, with performing adaptive cruise control or vehicle dynamics control. A sensor device 49 is provided for acquiring quantities related to actuation of the brake pedal 30 (pedal travel, pedal force, pedal actuating speed) for evaluation in the electronic control unit ECU in order also to effect braking operations in emergency situations, e.g. with the exceeding of a specific pedal actuating speed as a criterion.

A sensor means 53 is additionally provided for sensing values related to the vehicle dynamics (acceleration of the vehicle in straight orientation, rate of revolutions of the vehicle and its normal axis). Said values too are relayed to the control unit ECU which, on their basis, is in a position to initiate a necessary brake intervention at individual wheel brakes 37.

The anti-locking brake system shown in FIGS. 1 and 3 is in particular also set up for cruise control and vehicle dynamics control, for which in particular the valve arrangement according to FIG. 5, 6 is used.

The first fluid connection 7 of the valve arrangement 1 is connected to the brake pressure generating unit 31 and the second fluid connection 9 of the valve arrangement 1 is connected to the input side 42e of the pump 42. In the present case, the valve arrangement 1 according to the invention is designed so as to be electromagnetically actuable and is activated by the electronic control unit ECU. To said end, as is known and therefore not shown, the actuating device 17 is coupled operationally to an armature, which cooperates with an electromagnet arrangement.

Disposed parallel to the valve arrangement 1 in the brake line 36 between the brake pressure generating unit 31 and the output side 42a of the pump 42 is an electromagnetic valve 50, which is activated by the electronic control unit ECU and which in the non-actuated state 50.1 establishes the connection between the brake pressure generating unit 31 and the wheel brake 37 and in the actuated state 50.2 blocks said connection so that the output side 42a of the pump 42 is connected only to the wheel brake 37. The valve arrangement 1 and the electromagnetic valve 50 are activated by the electronic control unit ECU to connect the brake pressure generating unit 31 either to the wheel brake 37 or to the intake side 42e of the pump 42. Connected in parallel to the electromagnetic valve 50 is a pressure relief valve 51 which, in the event that a specific pressure value is exceeded in the wheel brake 37 and/or at the output side 42a of the pump 42, establishes a connection from the wheel brake 37 and/or the output side 42a of the pump 42 to the brake pressure generating unit 31 in order to prevent damage to the brake system.

A non-return valve 52 is disposed between the temporary store 41 and the input side 42e of the pump 42 so that a flow connection may be established only in the direction leading from the temporary store 41 to the intake side 42e of the pump 42. Thus, during preloading of the input side 42e of the pump 42, for which purpose the valve arrangement 1 is actuated, an escape of brake fluid into the temporary store 41 is prevented.

Figure 4:
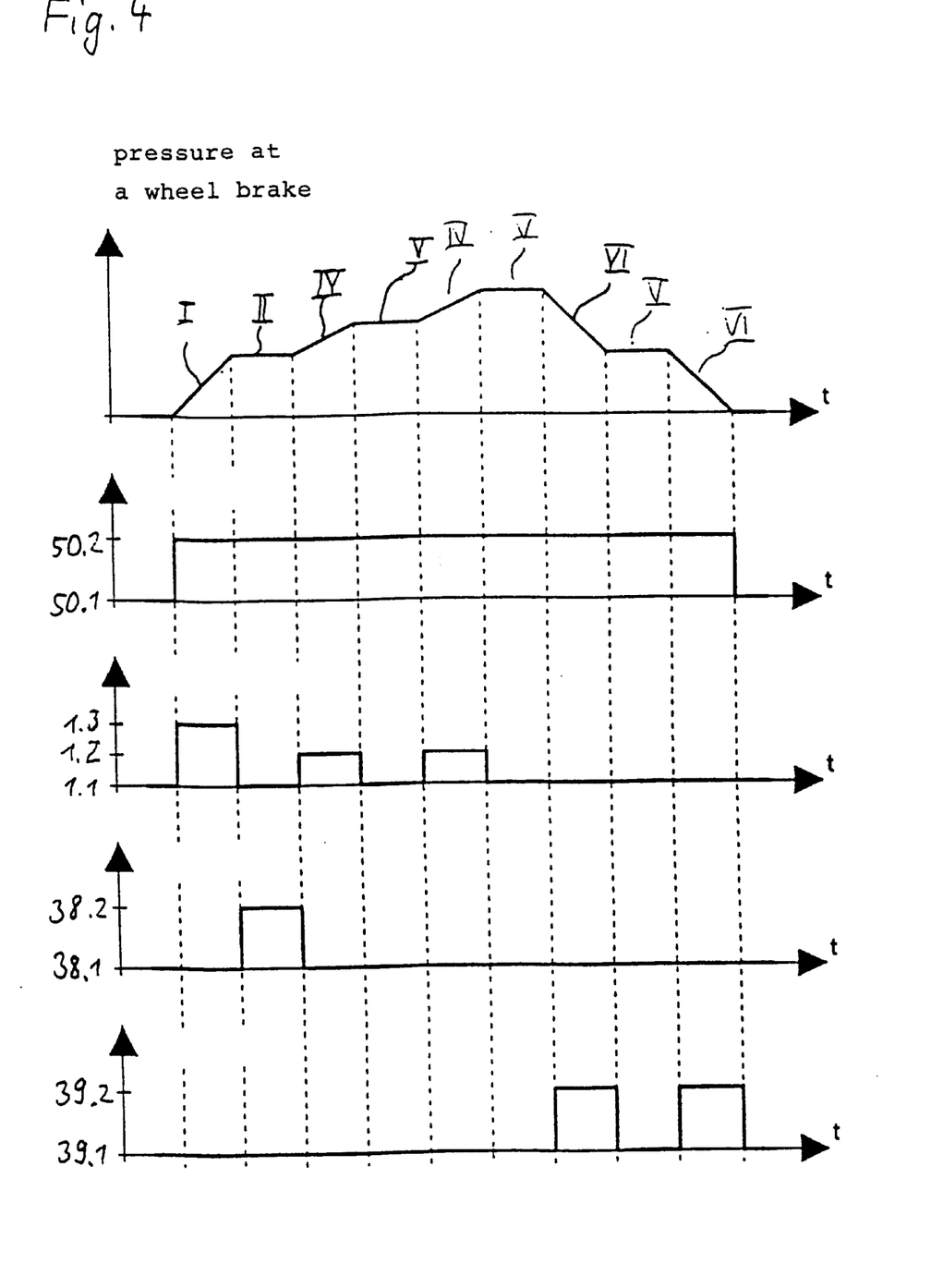
FIG. 4 shows a diagrammatic view of the pressure at a wheel brake during different operating phases and the associated positions of a valve arrangement and of electromagnetic valves of the vehicle brake system shown in FIG. 3.

During traction control, i.e. when the electronic control unit ECU detects a tendency to spin in the wheel associated with the wheel brake 37, the valve arrangements 1 and the electromagnetic valve 50 are actuated. The valve arrangement 1 is then in position 1.3, the electromagnetic valve in position 50.2. Since during traction control an actuation of the brake pedal 30 is not effected, the pump 42 may remove brake fluid from the store 35 via the pressure chamber 46 and the valve arrangement 1 and, since the electromagnetic valve 50 is blocking the connection to the brake pressure generating unit 31, may directly load the wheel brake 37 with said brake fluid in order to counteract the tendency to spin. This initiates the operating phase "build up pressure" illustrated by I in FIGS. 2 and 4. Here, it is advantageous that the valve arrangement 1 according to the invention releases a relatively large flow cross section A so that the pump 13, particularly at low temperatures, may deliver a sufficiently large volumetric flow.

On the other hand, during vehicle dynamics control, when the vehicle stability especially during cornering is improved by automatic braking, the input side 42e of the pump 42 is additionally preloaded with a brake pressure generated by the brake pressure generating unit 31 in order to achieve a very rapid pressure build-up in the wheel brake 37. This is effected by automatic activation of the brake booster 44, for which purpose a pressure in the order of magnitude of 5 to 30 bar, depending i.a. on the quality of the surface of the road, is adjusted in the pressure chamber 34 of the brake pressure generating unit 31. By preloading the pump 42 via its intake side 42e the effect is achieved that already during the starting phase an adequate pressure is available at the output side 42a of the pump 7. Because of the refinement according to the invention of the valve arrangement 1 no drawbacks of any kind arise here when the valve arrangement 1 is actuated counter to the pressure generated by the brake pressure generating unit 31. According to the invention there are also no restrictions on the dimensioning of the flow cross section of the valve arrangement 1 so that, in particular, the very good low-temperature performance is still maintained.

It is self-evident that the previously described preloading of the pump 42 is usable likewise during traction control. It is equally self-evident that, given use of a pump designed with a particularly high intake, no preloading of the type described above when using the electrically controllable brake booster is necessary, i.e. an electrically controllable brake booster is not necessarily required.

In the embodiment illustrated in FIG. 1 the valve arrangement 1 takes the form of a two-connection/three-position valve. The valve arrangement 1 is enabled such that during the above described operating phase I "build up pressure" (see FIG. 2) it is actuated with the electromagnetic valve 50, the pump 42 supplying brake fluid from the brake pressure generating unit 31 through the open electromagnetic valve 38 to the wheel brake 37.

Figure 2:
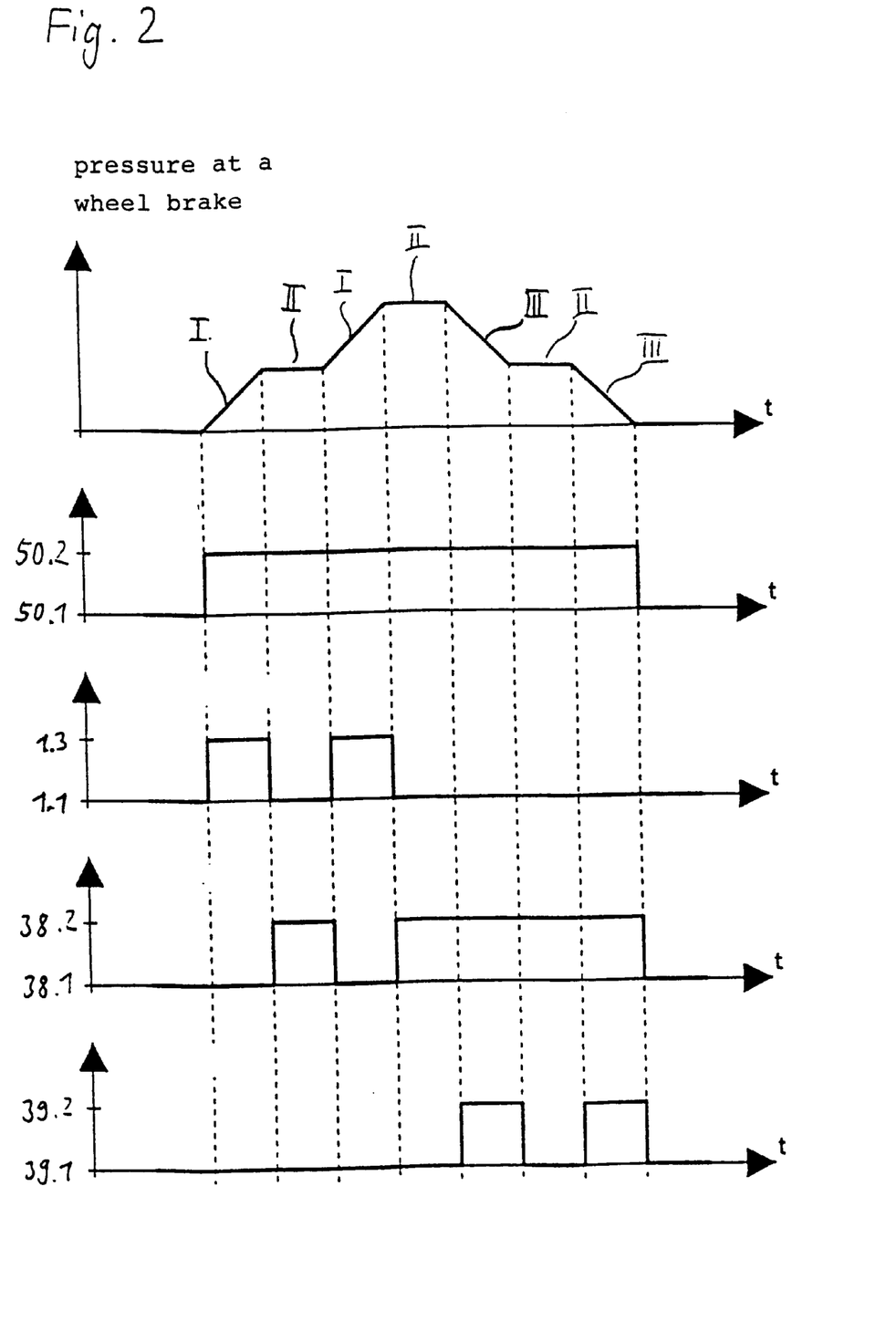
FIG. 2 shows a diagrammatic view of the pressure at a wheel brake during different operating phases and the associated positions of a valve arrangement and of electromagnetic valves of the vehicle brake system shown in FIG. 1.

During a subsequent operating phase II "maintain pressure" the valve arrangement 1 is closed so that no further brake fluid is supplied to the pump 42 through its input connection 42e. To prevent that residual brake fluid remaining at the input connection 42e is delivered through the pump 42 to the wheel brake 37, the electromagnetic valve 38 is actuated, namely closed, during operating phase II "maintain pressure".

Such operating phases can be repeated several times up to an operating phase III "reduce pressure". Both electromagnetic valves 38 and 39 are actuated during operating phase III "reduce pressure" (see FIG. 2) so that brake fluid can flow from the wheel brake 37 into the store 41. The electromagnetic valve 50 is at the same time actuated—i.e. blocked—and the valve arrangement 1 is not activated—i.e. also blocked. Pressure reduction is thus exclusively controlled by the store 41.

In the brake system illustrated in FIG. 3 the valve arrangement 1 takes the from of a two-connection/three position valve. In the primary position 1.3 said valve has the flow cross-section A which is larger than the secondary flow cross section B in the secondary position 1.2. During operating phase I "build up pressure" (see FIG. 4), said valve arrangement 1 is actuated analogously to the brake system illustrated in FIG. 1 and opens with the large flow cross-section A. In operating phase II "maintain pressure" (see FIG. 4) the valve arrangement 1 is closed as in the brake system of FIG. 1.

However, during an additional operating phase IV "build up further pressure" the position of the valve arrangement in FIG. 3 is not again opened with the large flow cross section A, but rather with the smaller flow cross section B. Thus it is possible to more accurately adjust the further pressure build-up.

During a subsequent operating phase V "maintain further pressure", no brake fluid that might be conveyed by the pump 42 is at the input connection 42e of the pump 42 owing to the severe throttling of the brake fluid during the operating phase "build up further pressure". Therefore, closing of the electromagnetic valve 38 is dispensed with during operating phase V "maintain further pressure", to reduce switching noises.

During subsequent operating phases VI "reduce further pressure" the electromagnetic valve 38 remains also non-actuated because already during an operating phase V "maintain further pressure" a pressure compensation has taken place from the output connection 42a of the pump 42 through the brake line 36 and the opened electromagnetic valve 38 up to the wheel brake 37, so that brake fluid flows exclusively into store 41 when opening the electromagnetic valve 39 at the beginning of operating phase VI "build up further pressure". This guarantees a controlled pressure reduction and at the same time reduces switching noises.

FIGS. 5 and 6 show an embodiment of the valve arrangement 1 illustrated in FIG. 3 in longitudinal section each. The construction of the valve arrangement 1 is essentially rotation symmetrical relative to a longitudinal axis L.

The valve arrangement 1 takes the form of a 2-connection/3-position valve in which in a non-actuated (normal) position 1.1 (see FIG. 3) the connection between the fluid connections 7 and 9 of the valve arrangement is blocked. In a first actuating position 1.2 (see FIG. 1) a secondary flow connection B is established between the fluid connections 7 and 9 of the valve arrangement 1. In a second actuating position 1.3 (see FIG. 1) a primary flow connection A is established between the fluid connections 7 and 9 of the valve arrangement 1. In said case, the primary flow connection A has a larger flow cross section than the secondary flow connection B (see FIG. 5). The valve arrangement 1 has a first valve element 3, which is biased into the normal position 1.1 by a spring arrangement 4. A first actuating device 17 is moreover provided for bringing the valve element 3 into the first actuating position 1.2. Finally, a further valve element 11 is provided, which is biased into the normal position 1.1 by a further spring arrangement 12. A further actuating device is used to bring the further valve element 11 into the second actuating position 1.3, so that upon actuation of the valve arrangement 1 initially only into the secondary flow connection B and then the primary flow connection A exists. The details of how this is achieved are described below.

The valve arrangement 1 comprises a housing 2, in which a valve element 3 and a spring arrangement 4 are accommodated coaxially with the longitudinal axis L. Formed in the housing 2 radially relative to the longitudinal axis L is a sealing seat 5, with which the valve element 3 cooperates in such a way that the valve element 3 under the action of the spring arrangement 4 is biased sealingly against the sealing seat 5, as is shown in FIG. 5. By said means a first pressure chamber 6, with which a first fluid connection 7 is associated, and a second pressure chamber 8, with which a second fluid connection 8 is associated, are formed. For biasing the valve element 3, the spring arrangement 4 is supported via the housing 2. For closing the first pressure chamber 8 a closure part 10 is provided, which is sealingly connected to the housing 2 and against which the spring arrangement 4 rests. The closure part 10 also comprises a neck-shaped recess for receiving the spring arrangement 4 in order to provide an—in relation to the longitudinal axis L—axial (inner) guide for the spring arrangement 4.

The valve element 3 is dome-shaped in order to accommodate at its side facing the first pressure chamber 6 a further valve element 11, which is spherical, and a further spring arrangement 12 coaxially with the longitudinal axis L. The valve element 3 has, coaxially with the longitudinal axis L, a central bore 13. Formed at the end of the central bore 13 facing the first pressure chamber 6 on the valve element 3 radially in relation to the longitudinal axis L is a sealing seat 14, with which the further valve element 11 cooperates in such a way that the further valve element 11 is biased under the action of the further spring arrangement 12 sealingly against the sealing seat 14 so that the first and the second pressure chambers 6, 8 are cut off from one another, as is shown in FIG. 2. In said case, for biasing the further valve element 11 the further spring arrangement 12 is supported via the valve element 3, wherein the further spring arrangement lies against a supporting part 15, which has fluid passages and is frictionally connected to the valve element 3, e.g. by means of an interference fit. As the valve element 3 is supported via the spring arrangement 4 against the housing 2, the further spring arrangement 12 is supported indirectly against the housing 2 so that the supporting part 15 may also be loosely connected to the valve element 3. The supporting part 15 lies between the valve element 3 and the spring arrangement 4 and has an outer edge, which radially embraces the spring arrangement 4 in order thereby to provide also an—in relation to the longitudinal axis L—axial (outer) guide for the spring arrangement 4.

To guarantee reliable functioning of the valve arrangement 1, it is important for the valve element 3 to be guided axially with a precise fit and low sliding friction. To said end, on the one hand the valve element 3 may be guided directly in the bore 16 of the housing 2, on the other hand the axial guiding in the bore 16 of the housing 2 may be achieved by means of the outer edge of the supporting part connected to the valve element 3.

For actuating the valve arrangement 1, an actuating device 17 is accommodated coaxially with the longitudinal axis L in the housing 2. The actuating device 17, at the end facing the valve element 3, is designed as a stepped plunger 18, 19. In said case, the front plunger 18 has a diameter which is smaller than the diameter of the central bore 13, so that the front plunger 18 in the central bore 13 penetrates the valve element 3 in order to cooperate with the further valve element 11. The diameter of the rear plunger 19 is larger than the diameter of the central bore 13, so that the rear plunger 19 cooperates with the valve element 3.

It is equally possible for the further valve element 11 to be integrally connected to the actuating device 17 and/or to the plunger 18 or 19 so that the further spring arrangement 12 may bias the actuating device 17 with the further spring arrangement 12 directly bearing against the housing 2. Said construction, on the one hand, dispenses with the supporting part 15 and, on the other hand, leads to a very compact design because the further spring arrangement 12 is integrated in the actuating device 17.

In the non-actuated state of the valve arrangement 1 shown in FIG. 5, the valve element 3 rests under the action of the spring arrangement 4 against the sealing seat 5 and the further valve element 11 rests under the action of the further spring arrangement 12 against the sealing seat 14, with the result that the first pressure chamber 6 and/or the first fluid connection 7 is cut off from the second pressure chamber 8 and/or the second fluid connection 9. In said case, the further spring arrangement 12 biases the actuating device 17 into its non-actuated position via the further valve element 11 and via the front plunger 18. The front plunger 18 is so dimensioned that, on the one hand, it forms with the central bore 13 a radial gap $S_R$ and, on the other hand, between the rear plunger 19 and the valve element 3 an axial gap $S_A$ is formed.

When the valve arrangement 1 is then actuated, for which purpose the actuating device 17 is moved in y direction, the front plunger 18 initially lifts the further valve element 11 counter to the action of the further spring arrangement 12 off the sealing seat 14, thereby establishing between the first and the second pressure chamber 6, 8 a secondary flow connection B which extends via the radial gap $S_R$, which the front plunger 18 forms in the central bore 13, as well as via the axial gap $S_A$, which exists between the valve element 3 and the rear plunger 19. As the radial gap $S_R$ and the axial gap $S_A$ are relatively large, the effective flow cross section of the secondary flow connection B is effectively determined by the annular-gap-shaped passage between the further valve element 11 and the sealing seat 14.

When during actuation of the valve arrangement 1 the actuating device 17 is moved further in y direction, the rear plunger 19 after traversing the dimension of the axial gap $S_A$ comes into abutment with the valve element 3, with the result that the latter is lifted counter to the action of the spring arrangement 4 off the sealing seat 5, thereby establishing a primary flow connection A between the first and the second pressure chamber 6, 8, with the effective flow cross section of the primary flow connection A being effectively determined by the annular-gap-shaped passage between the valve element 3 and the sealing seat 5. Said actuated state is shown in FIG. 6. As the flow cross section of the secondary flow connection B is negligible compared to the flow cross section of the primary flow connection A, it does not make a significant difference whether, while the primary flow connection A exists, the secondary flow connection B is maintained or blocked. For the secondary flow connection B may be blocked by the rear plunger 19 lying against the valve element 3 or maintained by suitably designing the front and/or rear plunger 18, 19, e.g. with transverse bores.

For the secondary flow connection B to be established in the previously described manner at an earlier time than the primary flow connection A, the bias force of the further spring arrangement 12 is lower than the bias force of the spring arrangement 4. Furthermore, the effective flow cross section of the secondary flow connection B is much smaller than the effective flow cross section of the primary flow connection A because the annular-gap-shaped passage between the valve element 3 and the sealing seat 5, owing to the previously described radial-geometric arrangement, is greater than the annular-gap-shaped passage between the further valve element 11 and the sealing seat 14. Because of said dimensioning of the valve arrangement 1, only a relatively low actuating force has to be summoned up by the actuating device 17 to establish the secondary flow connection B. For, in terms of force, initially only the low bias force of the further spring arrangement 12 and, not until later, the bias force of the spring arrangement 4 has to be surmounted.

In the situation where there is a higher pressure in the first pressure chamber and/or at the first fluid connection 7 than in the second pressure chamber 8 and/or at the second fluid connection 9, initially in addition to the bias force of the further spring arrangement 12 a pressure differential force has to be surmounted, which however because of the very small effective flow cross section of the secondary flow connection B is likewise low, so that the actuating force to be summoned up remains low. However, a pressure-equalizing process occurs between the first and the second pressure chamber 6, 8 via the secondary flow connection B, which (almost) completely reduces the pressure differential force so that later, during establishment of the primary flow connection A, only the bias force of the spring arrangement 4 has to be surmounted. If, on the other hand, the pressure difference between the first and the second pressure chamber 6, 8 were still to exist upon establishment of the primary flow connection A, because of the very large effective flow cross section of the primary flow connection A, a very high pressure differential force would have to be additionally surmounted which would lead to a substantial increase of the actuating force to be summoned up.

With regard to the valve arrangement 1 according to the invention it should on the whole be emphasized that between the first and the second fluid connection 7, 9 a flow connection with a very large effective flow cross section may be established, with the actuating force to be summoned up in relation thereto being very low.

Furthermore, upon actuation of the valve arrangement 1 it is possible through adjustment of the actuating force—via energization of the electromagnetic actuating device which is not shown in detail here—to select and/or adjust either the primary (A) or secondary (B) flow connection. Given e.g. energization controlled by pulse width modulation, this enables a very precise adjustment of the pressure level at the input and/or output side of the pump 42.

What is claimed is:

1. An anti-locking brake system for a land vehicle, which is set up for traction control and vehicle dynamics control in such a way that a pump for actuating a wheel brake removes brake fluid from a brake pressure generating unit and supplies it to the wheel brake, wherein a first valve arrangement is disposed in a connection between the brake pressure generating unit and an input connection of the pump which in a non-actuated (normal) position blocks the connection between the brake pressure generating unit and the input connection of the pump and, in at least one actuated position establishes a primary flow connection directly between the brake pressure generating unit and the input connection of the pump, a first electromagnetic valve is arranged in a connection between an output connection of the pump and the brake pressure generating unit, which, in a non-actuated (normal) position, establishes the connection between the output connection of the pump and the brake pressure generating unit and blocks it in an actuated position, a second electromagnetic valve is arranged in a direct connection to the wheel brake and is also connected to the wheel brake and the input connection of the pump, which, in a non-actuated (normal) position blocks the connection between the wheel brake and the input connection of the pump and establishes it in an actuated position, a third electromagnetic valve is arranged in a connection between the output connection of the pump and the wheel brake, which establishes the connection between the output connection of the pump and the wheel brake in a non-actuated position and blocks it in an actuated position, wherein during a pressure maintaining phase of operation the first valve arrangement is in the non-actuated position, the first electromagnetic valve is in the actuated position, the second electromagnetic valve is in the non-actuated position, the third electromagnetic valve is in the actuated position, and during a pressure reduction phase of operation the first valve arrangement is in the non-actuated position and the first, second and third electromagnetic valves are in the actuated position each, characterized in that the brake fluid flows only into the temporary store.

2. An anti-locking brake system for a land vehicle for traction control and vehicle dynamics control comprising:

a pump for actuating a wheel brake, said pump removes brake fluid from a brake pressure generating unit and supplies it to the wheel brake;

a first valve arrangement connectively disposed between the brake pressure generating unit and an input connection of the pump where, in a non-actuated normal position, blocks the connection between the brake pressure generating unit and the input connection of the pump and in at least one actuated position establishes a primary flow connection between the brake pressure generating unit through the pump to the wheel brake;

a first electromagnetic valve arranged in a connection between an output connection of the pump and the brake pressure generating unit which, in a non-actuated normal position, establishes the connection between the output connection of the pump and the brake pressure generating unit and blocks the output connection in an actuated position;

a second electromagnetic valve arranged in a direct connection to the wheel brake and is also connected to the wheel brake and the input connection of the pump which, in a non-actuated normal position blocks the connection between the wheel brake and the input connection of the pump and establishes the input connection in an actuated position;

a third electromagnetic valve arranged in a connection between the output connection of the pump and the wheel brake which establishes the connection between the output connection of the pump and the wheel brake in a non-actuated position and blocks the output in an actuated position;

wherein during a maintain pressure operating phase the first valve arrangement is in the non-actuated position, the first electromagnetic valve is in the actuated position, the second electromagnetic valve is in the non-actuated position, the third electromagnetic valve is in the actuated position; and wherein during a reduce pressure actuating phase the first valve arrangement is in the non-actuated position and the first, second and third electromagnetic valves are each in the actuated position, wherein the brake fluid flows only into the temporary store.

3. The anti-locking brake system defined in claim 2 wherein:

in a further actuated position, the first valve arrangement establishes a secondary flow connection between the brake pressure generating unit and the input connection of the pump, the secondary flow connection having a smaller flow cross section than the primary flow connection; and during a build up pressure operating phase the first valve arrangement is in the further operated position while the first electromagnetic valve is in the actuated position and the second and third electromagnetic valves are each in the non-actuated position.

4. The anti-locking brake system defined in claim 3 wherein during a maintain pressure operating phase, the third electromagnetic valve is in the non-actuated position while the first electromagnetic valve is in the actuated position and the first valve arrangement and the second electromagnetic valve are each in the non-actuated position.

5. The anti-locking brake system defined in claim 4 wherein during a reduce pressure operating phase, the third electromagnetic valve is in the non-actuated position, while the first and second electromagnetic valves are each in the actuated position and the first valve arrangement is in the non-actuated position.

6. An anti-locking brake system for a land vehicle for traction control and vehicle dynamics control comprising:

a pump for actuating a wheel brake, said pump removes brake fluid from a brake pressure generating unit and supplies it to the wheel brake, wherein a valve arrangement is disposed between the brake pressure generating unit and an input connection of the pump which is a 2-connection/3-position valve and blocks the connection between the brake pressure generating unit and the input connection of the pump in a non-actuated (normal) position;

the valve arrangement establishes a secondary flow connection between the brake pressure generating unit and the input connection of the pump in a first actuating position;

the valve arrangement establishes a primary flow connection directly between the brake pressure generating unit and the input connection of the pump in a second actuating position; and the primary flow connection has a larger flow cross section than the secondary flow connection.

7. The anti-locking brake system defined in claim 6 wherein the valve arrangement comprises a firs valve element that is biased into the normal position by a spring arrangement;

a first actuating device is provided for setting the valve element to the first actuating position; and a further valve element is provide which is biased into a normal position by a further spring arrangement and is adapted to be set by a further actuating device to the second actuating position so that upon actuation of the valve arrangement, initially only the secondary flow connection is established and subsequently the primary flow connection is establishes.

8. The anti-locking brake system defined in claim 7 wherein one or both of first actuating device and the further actuating device are controlled by one or both of electromagnetic and hydraulic means.

9. The anti-locking brake system defined in claim 8 wherein the valve element and the further valve element are actuated by a common actuating device.

10. The anti-locking brake system defined in claim 9 wherein the valve element is dome-shaped and the further valve element is spherical with the further valve element being disposed inside the valve element.

11. The anti-locking brake system defined in claim 10 wherein the bias force of the spring arrangement is greater than the bias force of the spring arrangement is greater than the bias force of the further spring arrangement.

12. The anti-locking brake system defined in claim 11 wherein the primary flow connection is defined by sealing seat formed on the housing of the valve arrangement and by the valve element.

13. The anti-locking brake system according to claim 12 wherein the secondary flow connection is defined by a sealing seat formed on the valve element and by the further valve element.

14. The anti-locking brake system defined in claim 13 wherein the spring arrangement bears against the housing of the valve arrangement.

15. The anti-locking brake system defined in claim 14 wherein the further spring arrangement is supported via the valve element.

16. The anti-locking brake system defined in claim 15 wherein the further valve element is integrally connected to the actuating device.

17. The anti-locking brake system defined in claim 16 wherein the further spring arrangement biases the actuating device for the further valve element to assume the actuating device first position, the further spring arrangement bearing against the housing of the valve arrangement.

* * * * *

UNITED STATES PATENT AND TRADEMARK OFFICE
CERTIFICATE OF CORRECTION

PATENT NO. : 6,641,230 B2
DATED : November 4, 2003
INVENTOR(S) : Helmut Gegalski et al.

It is certified that error appears in the above-identified patent and that said Letters Patent is hereby corrected as shown below:

Column 17,
Line 6, after "by" insert -- a --.

Signed and Sealed this

Sixteenth Day of December, 2003

JAMES E. ROGAN
*Director of the United States Patent and Trademark Office*